United States Patent
Custers

(10) Patent No.: US 12,269,327 B2
(45) Date of Patent: Apr. 8, 2025

(54) ROLLO ASSEMBLY

(71) Applicant: INALFA ROOF SYSTEMS GROUP B.V., Oostrum (NL)

(72) Inventor: Jur Johannes Maria Custers, Lottum (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 232 days.

(21) Appl. No.: 17/982,930

(22) Filed: Nov. 8, 2022

(65) Prior Publication Data

US 2023/0144477 A1 May 11, 2023

(30) Foreign Application Priority Data

Nov. 10, 2021 (EP) ..................................... 21207595

(51) Int. Cl.
*B60J 7/00* (2006.01)
(52) U.S. Cl.
CPC .................................. *B60J 7/0015* (2013.01)
(58) Field of Classification Search
CPC ...... B60J 1/2044; B60J 1/2052; B60J 1/2063; B60J 7/0007; B60J 7/0015; B60J 7/067; B60J 7/043; B60R 13/0231; B60Q 3/208; E06B 9/56; E06B 9/44; E06B 9/40; E06B 9/42
USPC .............. 296/97.8, 97.11, 98, 214, 211, 219, 296/216.08; 160/370.22, 266, 238
See application file for complete search history.

(56) References Cited

U.S. PATENT DOCUMENTS

| | | | | |
|---|---|---|---|---|
| 8,419,119 | B2* | 4/2013 | Nakamura | B60J 7/0015 160/265 |
| 9,351,599 | B2* | 5/2016 | Roberts | E06B 9/54 |
| 9,827,836 | B2* | 11/2017 | Nellen | B60J 7/185 |
| 9,889,726 | B2* | 2/2018 | Umeki | B60J 1/2041 |
| 11,014,434 | B2* | 5/2021 | Kobayashi | B60J 7/0015 |

(Continued)

FOREIGN PATENT DOCUMENTS

| | | | |
|---|---|---|---|
| CN | 111483303 A | * | 8/2020 |
| EP | 4019305 A1 | | 12/2020 |

(Continued)

OTHER PUBLICATIONS

European Search Report in corresponding European Patent Application No. 21207595.6 dated Apr. 21, 2022.

*Primary Examiner* — Amy R Weisberg
*Assistant Examiner* — Whitney Nicole Francis
(74) *Attorney, Agent, or Firm* — Steven M. Koehler; Westman, Champlin & Koehler, P.A.

(57) ABSTRACT

A rollo assembly intended for use in a roof system for a vehicle, comprises a rotatable winding shaft accommodated in a rollo housing. A rollo screen has a rear end which can be wound on or off the winding shaft to enable the rollo screen to move between an open and closed position. An opposite forward end of the rollo screen is provided with an operating beam to move the rollo screen between the open and closed position. Opposite guide channels hold opposite side edges of the rollo screen and guide them in a longitudinal direction. Each end portion of the guide channels adjacent to the rollo housing includes a lower wall part formed by a respective guide rail and an upper wall part formed by a guide part which belongs to or is fixed to the rollo housing.

15 Claims, 9 Drawing Sheets

(56) References Cited

U.S. PATENT DOCUMENTS

| | | | |
|---|---|---|---|
| 2010/0032991 A1* | 2/2010 | Keller | B60J 7/0015 |
| | | | 296/214 |
| 2012/0180961 A1* | 7/2012 | Lin | B60J 7/0015 |
| | | | 160/370.22 |
| 2016/0280050 A1* | 9/2016 | Shiraishi | B60J 7/0007 |
| 2017/0120735 A1* | 5/2017 | Ide | B60J 7/067 |
| 2018/0105025 A1* | 4/2018 | Bott | B60J 7/0015 |
| 2019/0299761 A1* | 10/2019 | Hiramatsu | B60J 7/043 |
| 2019/0315204 A1* | 10/2019 | Hiramatsu | B60J 7/0015 |
| 2020/0198449 A1* | 6/2020 | Kim | B60J 7/02 |
| 2021/0046810 A1* | 2/2021 | Mueller | B60J 7/0015 |
| 2021/0300163 A1* | 9/2021 | Giese | B60J 1/2069 |
| 2022/0111711 A1* | 4/2022 | Ling | B60J 7/043 |
| 2023/0030300 A1* | 2/2023 | Riegger | B60J 7/0015 |

FOREIGN PATENT DOCUMENTS

| | | | |
|---|---|---|---|
| EP | 4122728 A1 * | 1/2023 | B60J 1/2052 |
| JP | 2014234018 A * | 12/2014 | |
| WO | 199601191 A1 | 1/1996 | |
| WO | 2022144254 A1 | 7/2022 | |

\* cited by examiner

Fig. 3a
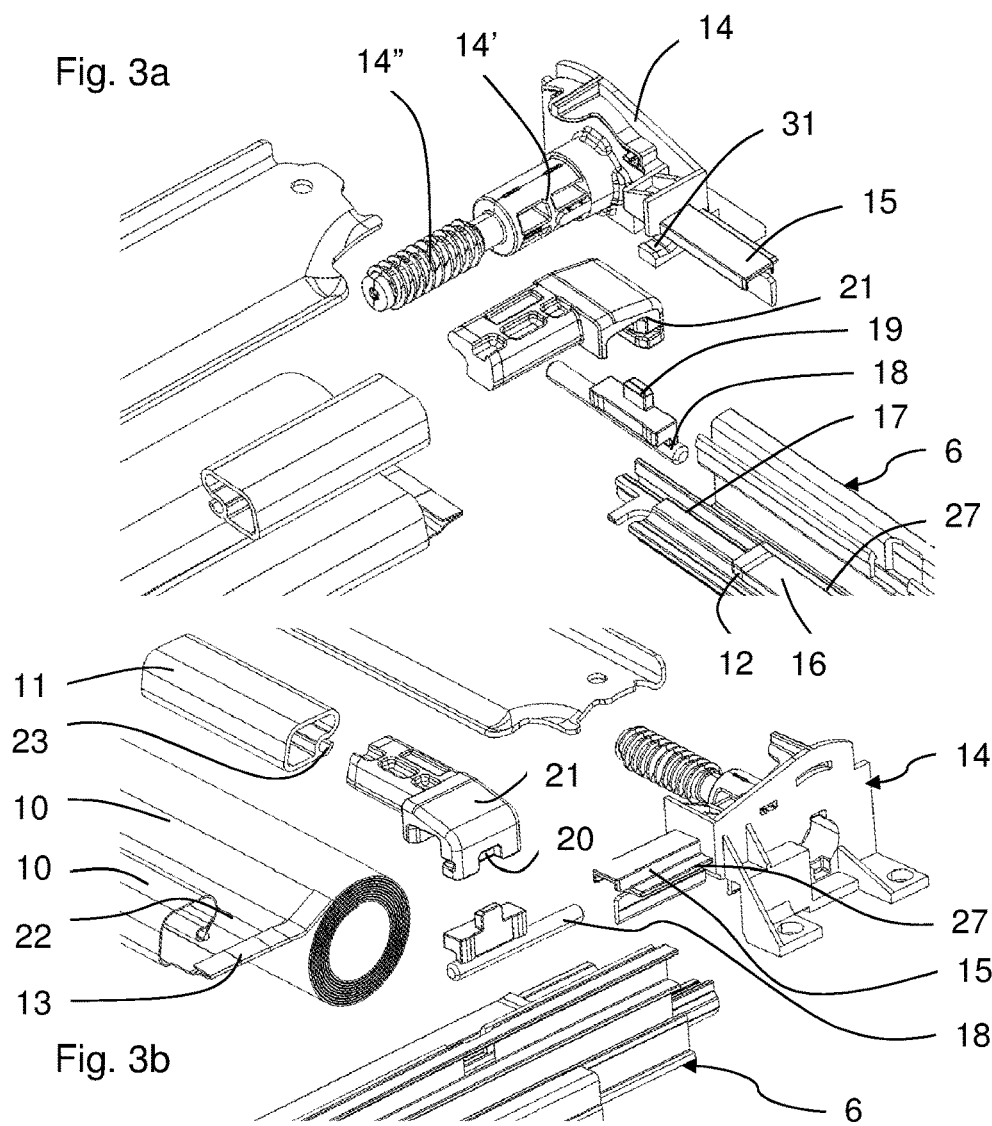
Fig. 3b
Fig. 3c
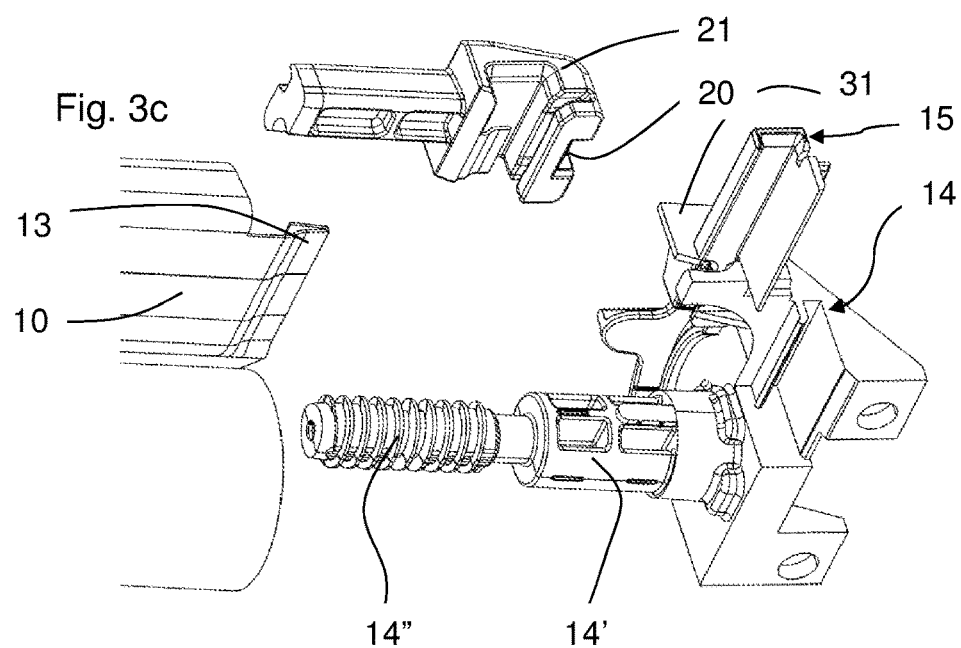

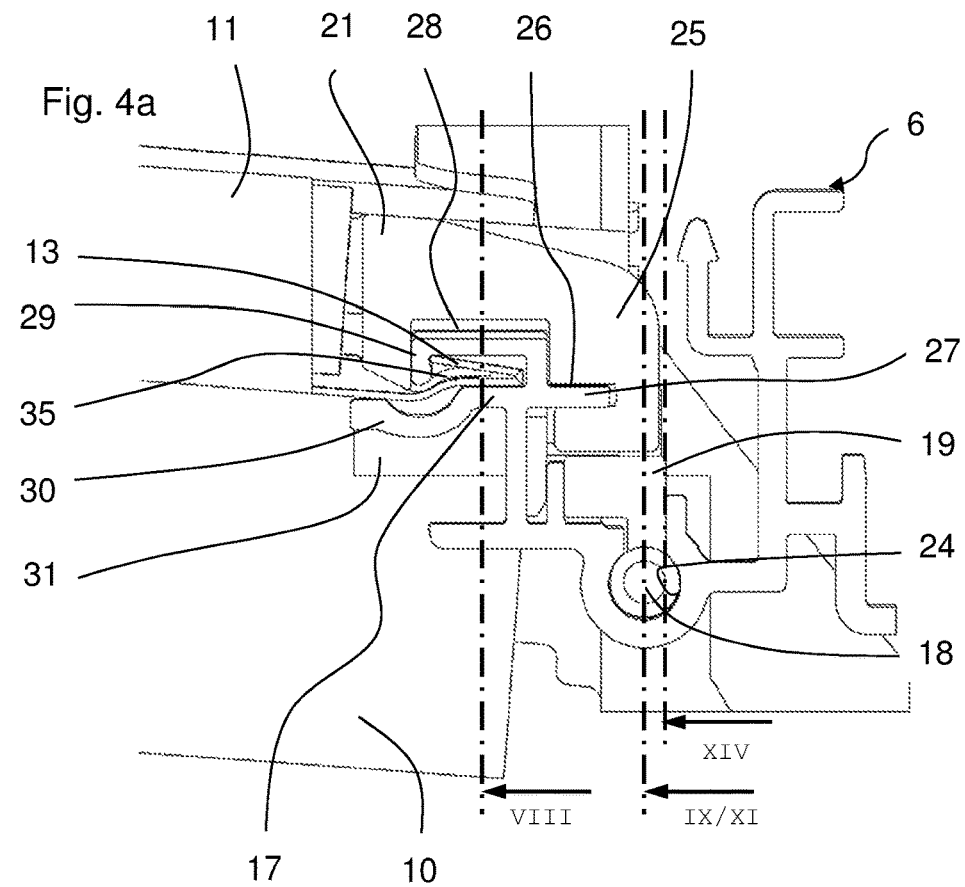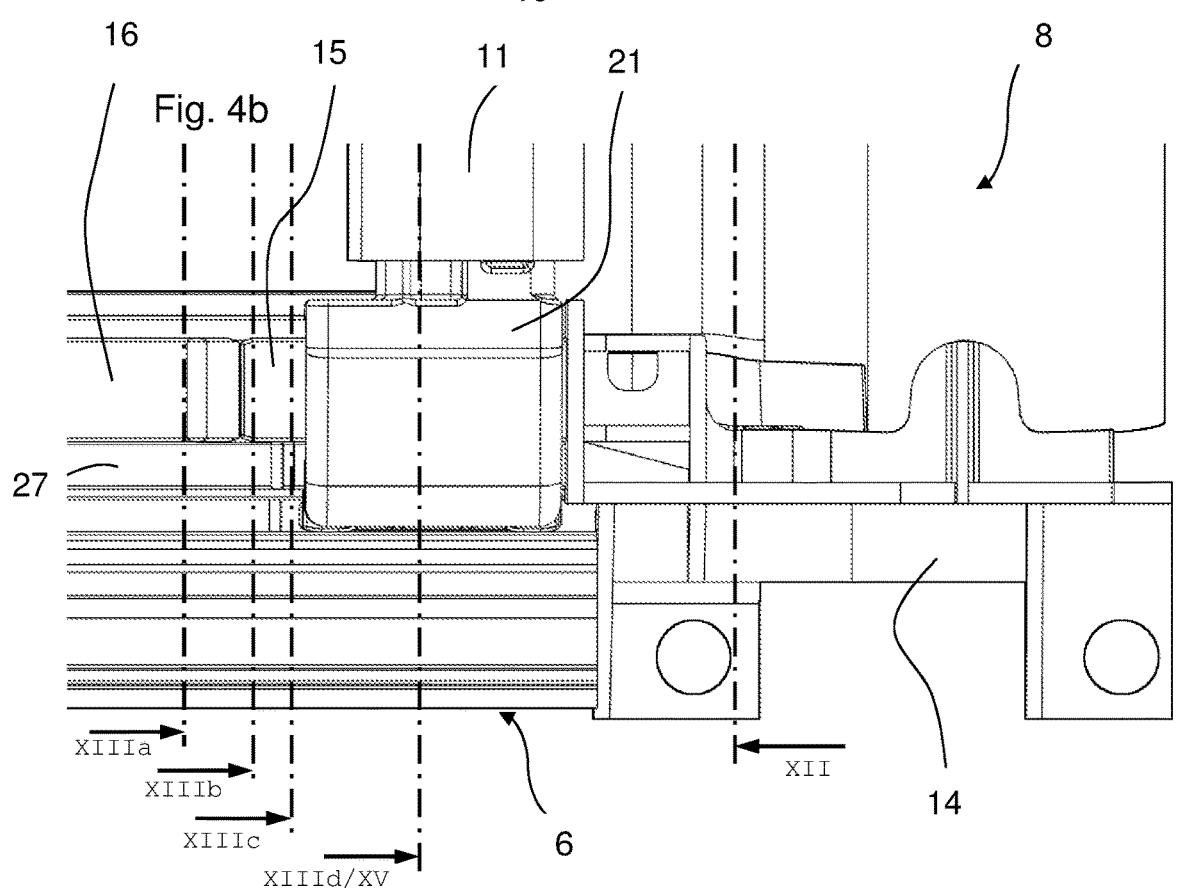

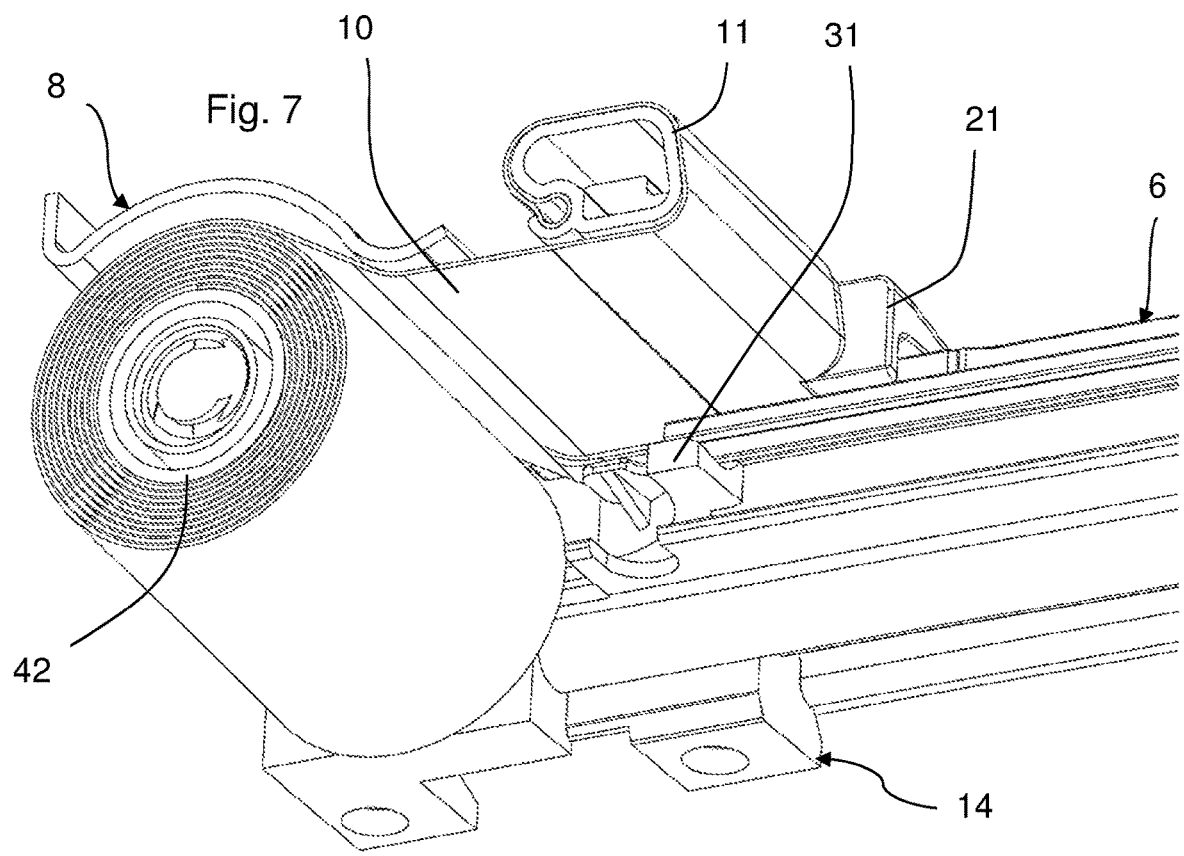
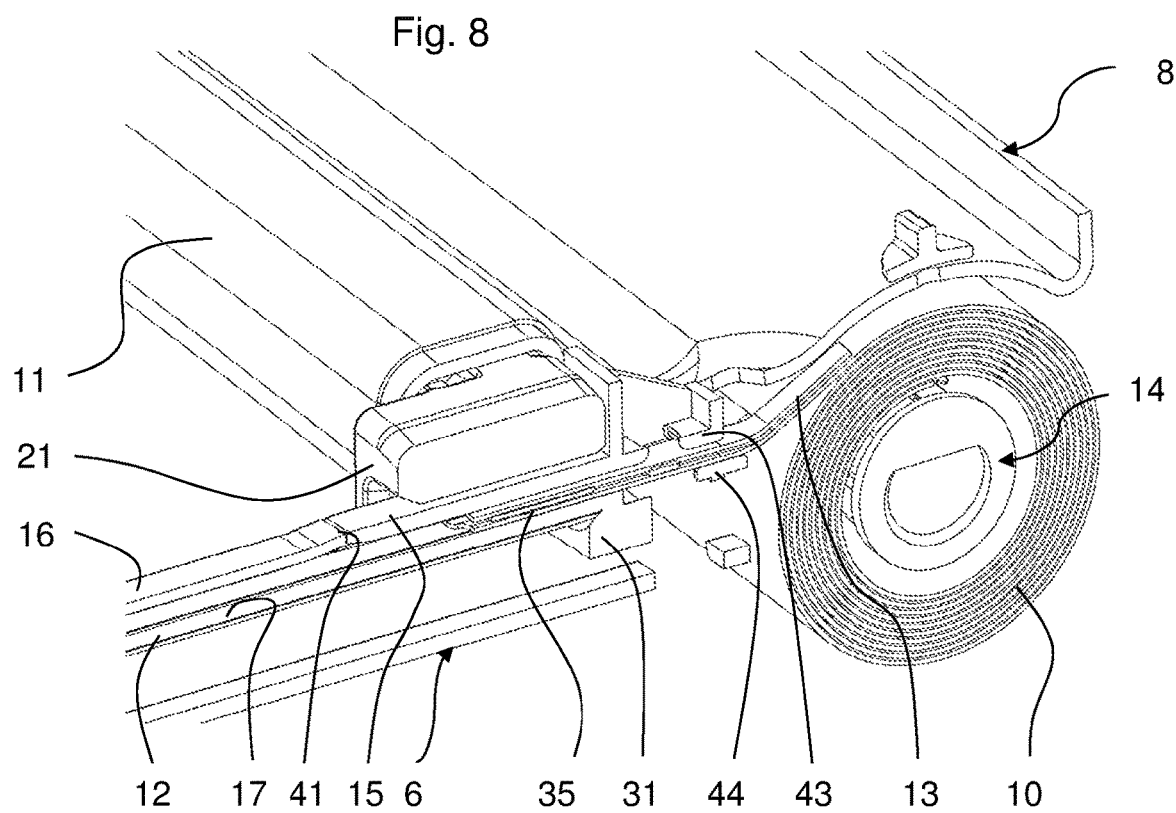

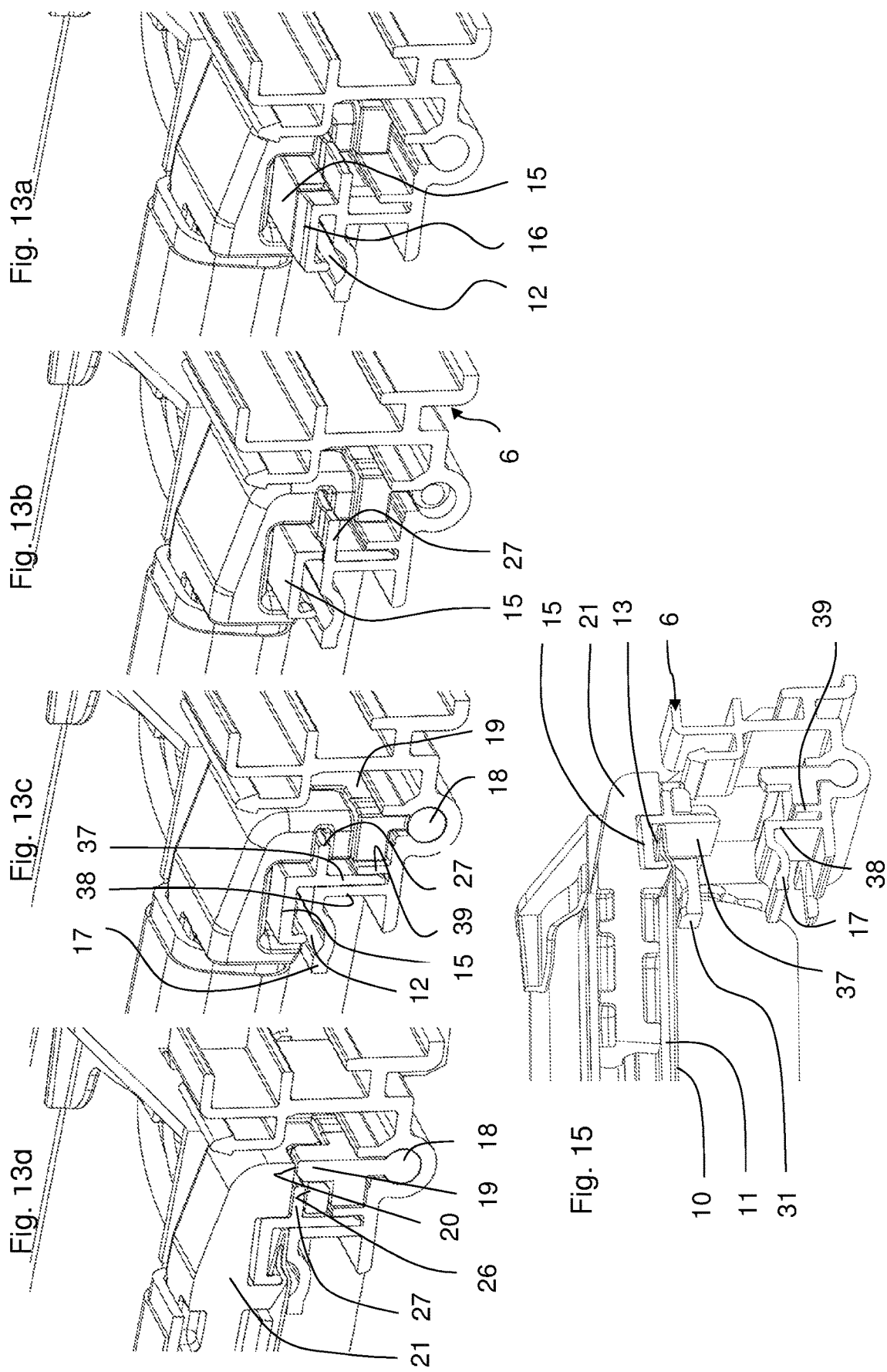

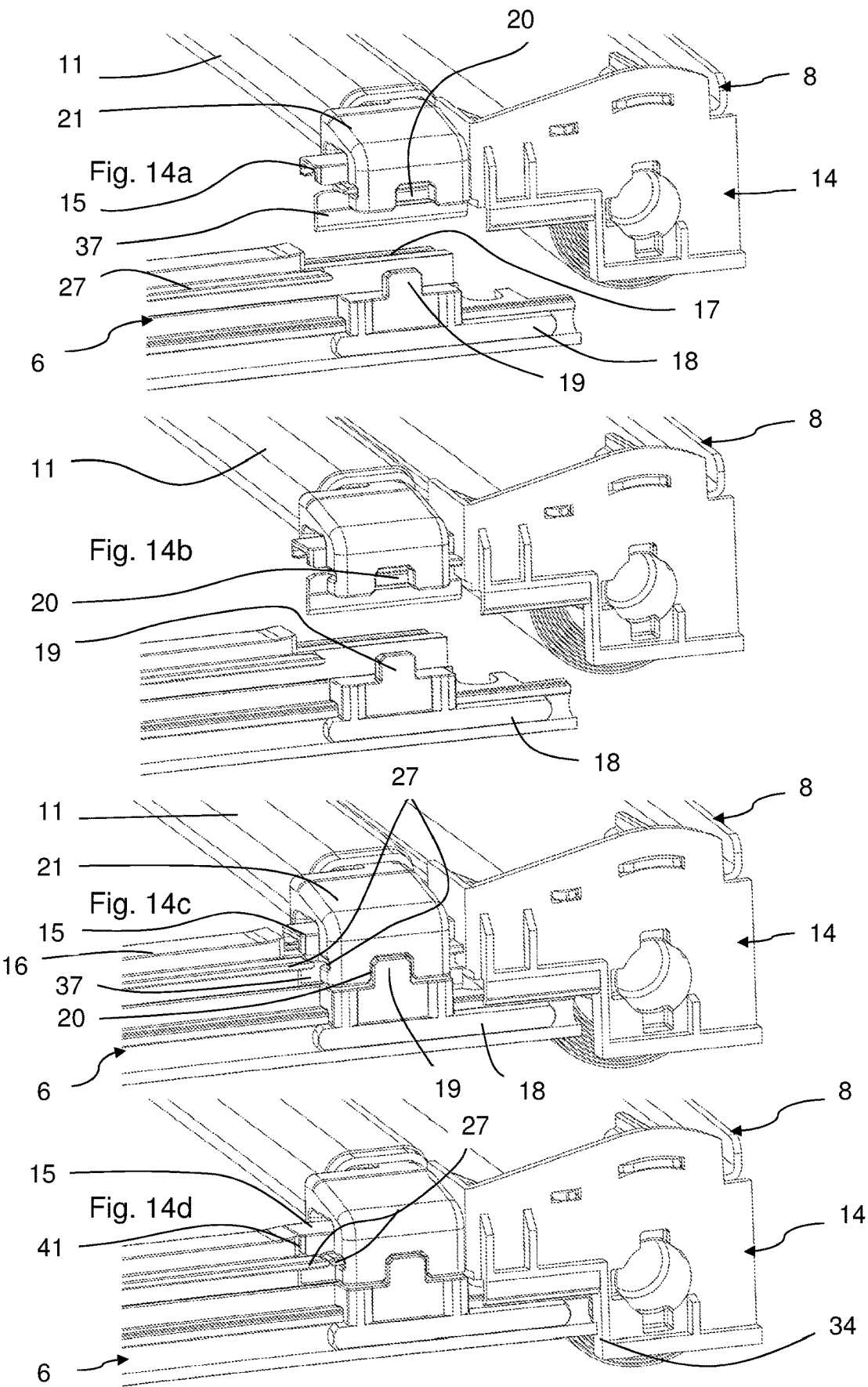

ROLLO ASSEMBLY

BACKGROUND

The discussion below is merely provided for general background information and is not intended to be used as an aid in determining the scope of the claimed subject matter.

Aspects of the invention relate to a rollo assembly intended for use in a roof assembly for a vehicle.

Such rollo assembly is known from practice. In a prior art rollo system the rollo housing is provided with a lead-in or guide part for the side edge of the rollo screen connecting to the guide channel of the guide rail. This guide part comprises an upper wall part and a lower wall part connecting to the upper and lower wall parts of the guide rail. This results in a transition between the guide part of the rollo housing and the guide channel which may cause wear to the side edges of the rollo screen. In order to avoid the transition during operation of the rollo, the starting position of the operating beam (fully open position of the rollo screen) should be beyond the lead-in, which means additional required space in longitudinal (X) direction.

SUMMARY

A rollo assembly intended for use in a roof system for a vehicle, comprises a rotatable winding shaft accommodated in a rollo housing. A rollo screen has a rear end which can be wound on or off the winding shaft to enable the rollo screen to move between an open and closed position. An opposite forward end of the rollo screen is provided with an operating beam to move the rollo screen between the open and closed position. Opposite guide channels hold opposite side edges of the rollo screen and guide them in a longitudinal direction. Each end portion of the guide channels adjacent to the rollo housing includes a lower wall part formed by a respective guide rail and an upper wall part formed by a guide part which belongs to or is fixed to the rollo housing. By maintaining the lower wall part of the guide channel of the guide rails up to the rollo housing and providing the guide parts of the rollo housing with only the upper wall part, there is no transition in the lower wall part which could cause wear to the rollo screen. The transition in the upper wall parts causes much less wear as the weight of the rollo screen rests mainly on the lower wall parts. Thus, the operating beam can have its starting position at the guide parts.

Preferably, the length of the guide parts is much shorter than the length of the guide channels and a free end of each guide part facing away from the winding shaft abuts an upper wall part of the guide channel formed by the guide rail.

The guide parts will preferably be just long enough to support the operating beam in its starting position adjacent the rollo housing and will then each abut the upper wall part of the guide channel in the guide rail to complete the guide channel.

To obtain this, opposite end parts of the operating beam extend above an upper side of the guide parts in the open position of the rollo screen and rest on them.

If the opposite end parts of the operating beam are each provided with a low friction liner or slide shoe, which cooperates with an external portion of the guide rail and of the guide part, the operating beam is guided with a low sliding resistance.

The guide rails and the guide parts may be provided with aligned and abutting guide ribs, which are preferably substantially horizontal and are positioned on a wall of the guide rails and guide parts facing away from the rollo screen. The opposite end parts of the operating beam may then be provided with a groove in a wall of the end parts of the operating beam facing the rollo screen, said guide ribs engaging the corresponding guide grooves.

In this way, the end parts of the operating beam are locked in vertical direction by the guide ribs which are provided on both the guide parts and the guide rails. The operating beam will be preassembled with the rollo housing by sliding the end parts of the operating beam onto the guide parts. When the rollo housing with the guide parts are assembled with the guide rails, the end parts can be moved by a sliding movement from the guide parts onto the guide rails.

The length of the guide rib on the guide parts may be smaller than the length of the guide parts, whereas the guide rib of the guide rails may be longer than the upper wall part of the guide channel in the guide rails and a protruding portion of the guide rib may then be clamped within a groove of the guide part. In this way, the guide part is locked in vertical direction with respect to the guide rail at the front of the guide part. If the guide part or rollo housing comprises a clamping projection engaging the guide rail from below, the guide part will be fixed in vertical direction with respect to the guide rail at the end near the rollo housing as well. The locks can be accomplished simultaneously by sliding the guide parts with respect to the guide rails once it is in place in vertical direction.

The operating beam is preferably driven by drive cables coupled to the opposite end parts of the operating beam and guided by cable guides in the guide rails, and wherein the opposite end parts of the operating beam engage a coupling part on the drive cables from above.

In this way, the operating beam is coupled to the drive cables simultaneously with positioning the guide parts onto the guide rails.

The guide parts may include a downwardly extending flange engaging between upwardly extending flanges of the guide rails, which further locks the guide parts with respect to the guide rails.

The invention also includes a roof assembly for a vehicle comprising the rollo assembly as described above.

BRIEF DESCRIPTION OF THE DRAWINGS

Hereinafter aspects of the invention will be elucidated with reference to the drawing in which:

FIGS. 3a and 3b are enlarged exploded views from two different directions, showing the parts at one end of the rollo and guide rail.

FIG. 3c on an even larger scale the end parts of the rollo housing and operating beam and a portion of the rollo screen.

FIG. 4a is an enlarged section view along the line IVa-Iva in FIG. 2a without the frame.

FIG. 4b is an enlarged plan view of detail IVb in FIG. 2a without the frame.

FIG. 7 shows the rollo system including the guide rail of FIG. 5 from a slightly different angle and without the frame.

FIG. 8 is a perspective sectional view along the line VIII in FIG. 4a.

FIG. 9 is a perspective sectional view along the line IX in FIG. 4a

FIG. 11 is a perspective sectional view along the line XI in FIG. 4a.

FIGS. 13a-13d are perspective sectional views along the lines XIIIa-XIIId in FIG. 4b.

FIG. 14d is a perspective sectional view along the line XIV in FIG. 4a, while FIGS. 14a-14c is the same view as FIG. 14d but showing different mounting stages preceding the mounted state of FIG. 14d.

FIG. 15 shows the position of the rollo housing with respect to the guide rail according to FIG. 14a, but in a sectional view along the line XV in FIG. 4b.

DETAILED DESCRIPTION

Figure 1:
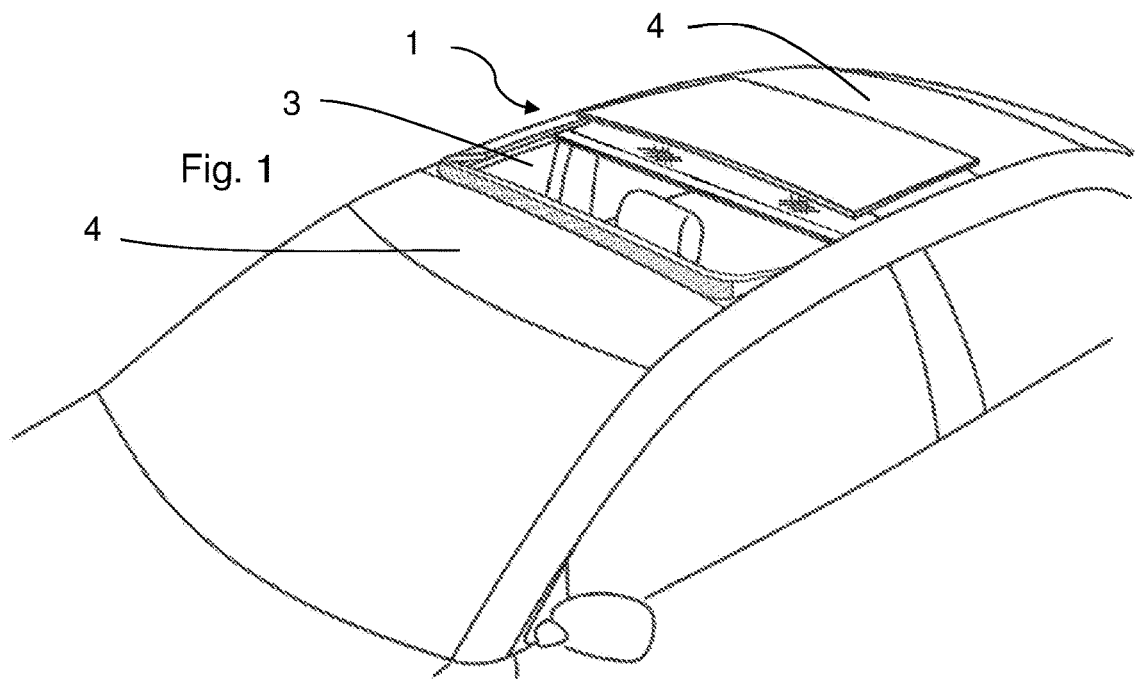
FIG. 1 is a perspective view of un upper part of a vehicle comprising a roof system.

FIG. 1 shows an upper part of a vehicle, in this case a passenger car. The vehicle comprises a roof system generally indicated by reference number 1 and for example comprising a movable panel 2 for opening and closing a roof opening 3. The roof system is attached to a stationary part 4, in particular a fixed roof of the vehicle. The roof system may also comprise more than one panel, for example a movable and a fixed panel. However, also one fixed panel is conceivable. The one or more panels will generally be fully or partly transparent.

Figure 2A:
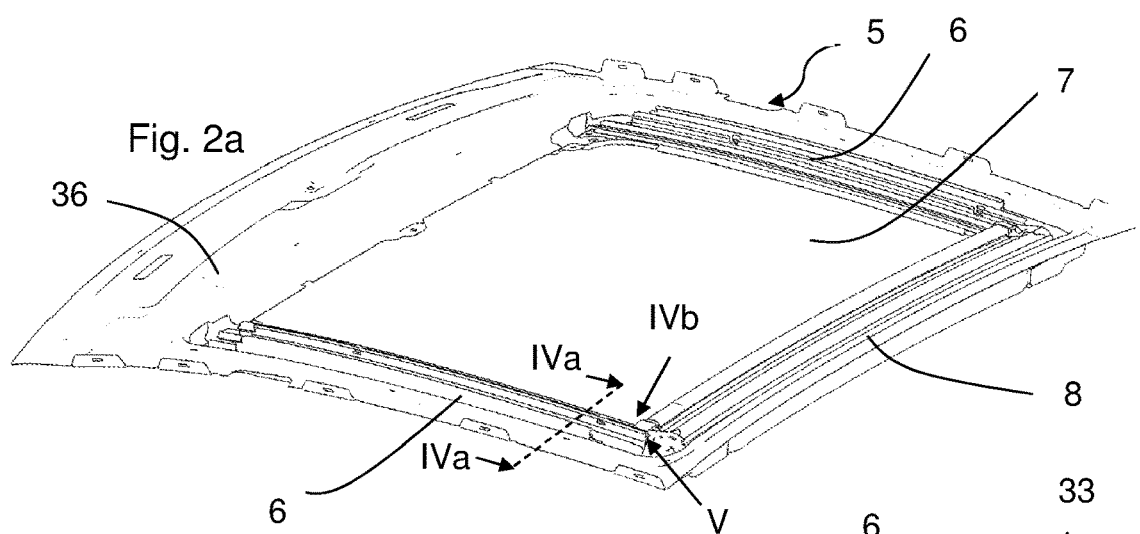
FIG. 2a is an enlarged perspective view of a frame from the roof system of FIG. 1 together with the rollo system.
Figure 2B:
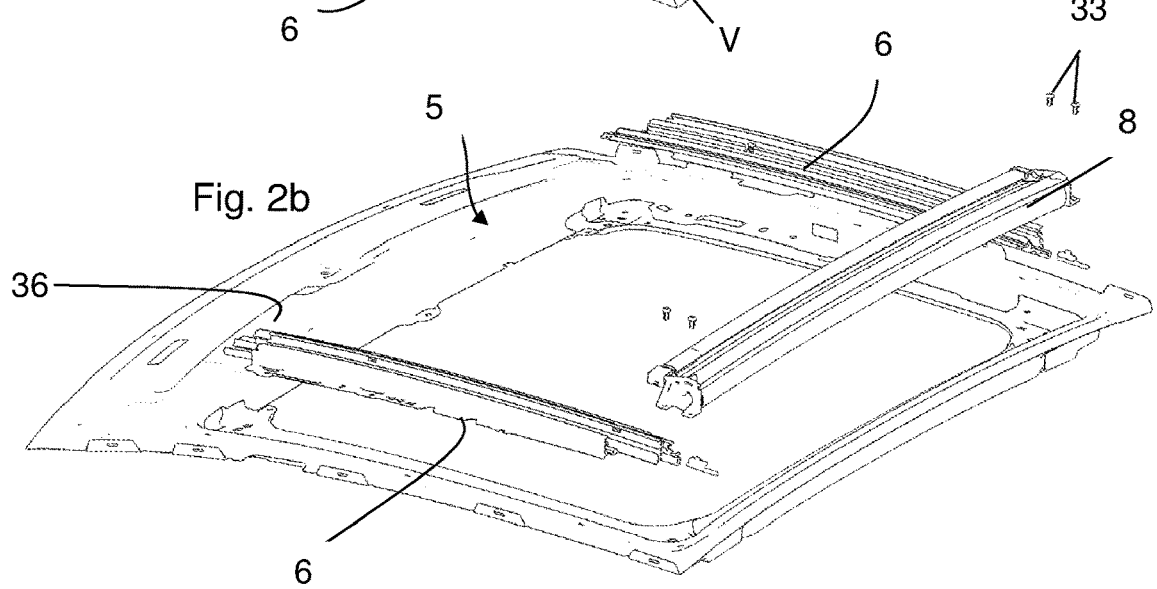
FIG. 2b is an exploded view version of FIG. 2a, with the rollo system and guide rails shown separately.

FIGS. 2a and 2b show a frame 5 of the roof system 1 which is used to mount the roof assembly to the fixed roof 4. The frame 5 is also used to support all parts of the roof system. FIGS. 2a and 2b show some of these parts, i.e., two guide rails 6 extending in longitudinal direction of the vehicle on opposite sides of a passage opening 7 in frame 5. When roof system 1 mounted in the vehicle, passage opening 7 is positioned vertically in line and below roof opening 3. Adjacent the rear side of passage opening 7, the frame supports a rollo housing 8 forming part of a rollo assembly which can be used to cover closed panel 2 from below in order to keep sun rays out of the vehicle interior. As its main components the rollo assembly comprises a rotatable winding shaft 9 (and/or winding roller 42, see FIG. 5, 7), a rollo screen 10 of which a rear end can be wound on or off said winding shaft 9/winding roller 42 and of which an opposite forward end is provided with (or attached to) an operating beam 11.

The manner in which the winding shaft 9/winding roller 42 is driven may vary and is not important for the present invention. One option is that the winding shaft 9/winding roller 42 is spring loaded for winding the rollo screen 10 when operating beam 11 is moved toward rollo housing 8.

The rollo assembly further comprises in guide rails 6 opposite guide channels 12 for guiding opposite side edges of the rollo screen 10 in a longitudinal direction. These guide channels 12 (of which only one is shown) generally will be positioned at the inner edges of guide rails 6. These guide rails 6 include further guide channels and/or guide grooves for slidably guiding parts of an operating mechanism for panel 2. Such operating mechanism is not shown, but is well known in the art.

FIGS. 3a, b and c show an end of rollo housing 8 and an end of the corresponding guide rail 6. It should be understood that the same parts will be present on the other side of passage opening 7, although in mirror image.

These figures show a part of rollo screen 10 fixed at free end 10' to operating beam 11 and wound at opposite end 10" onto winding shaft 9 (not shown here). The opposite sides edges of rollo screen 10 are each provided with a guide strip 13 which is bendable around a transverse axis, but more or less stiff around a longitudinal axis, such that guide strip 13 can be hooked into guide channel 12 so as to hold side edges of rollo screen in transverse direction and prevents it from sagging. Depending on the available space, these guide strips 13 will be wound onto winding shaft 9 folded onto the remainder of rollo screen 10, i.e., substantially as it is within guide channel 12, or they can be unfolded so as to positioned in line with the remainder of rollo screen 10. The latter method will be used if a minimal height of rollo housing is important (the side edges of rollo screen 10 will be wound more compact). Some additional space is needed for the unfolded guide strips 13 in lateral direction and also a folding and unfolding area will be needed in longitudinal direction. If the first-mentioned method is used, this is not needed, only the diameter of the rollo housing will be larger.

An end part 14 of rollo housing 8 is shown, which includes a support 14' for the winding roller 42 and a support 14" for a winding spring (not shown). The construction of the winding mechanism does not play a role here, but may e.g., be like in European published patent application number 4019305 A1, the contents of which are incorporated herein by reference thereto in its entirety. FIG. 3 further shows that end part 14 also comprises a guide part 15 forming an upper wall part of guide channel 12, said portion being adjacent rollo housing 8 or winding shaft 9. As is shown in FIG. 3 an upper wall part 16 of guide channel 12 ends short of the end of guide rail 6 and only a lower wall part 17 of guide channel 12 extends further towards rollo housing 8. Thus, the length of guide part 15 is much shorter than the length of the complete guide channel 12. A free end of guide part 15 facing away from the winding shaft 9 abuts upper wall part 16 of guide channel 12 formed by guide rail 6 (see FIG. 4b). As a result, the lower side of rollo screen 10 is guided along a continuous lower wall part 17 of guide channel 12, so there is no transverse seam that could interfere and cause wear on the lower side of rollo screen 10.

FIG. 3 also clearly shows a drive cable 18 for driving operating beam 11 to close and open rollo screen 10. Drive cable 18 is provided on its upper side with a coupling part in the form of a coupling cam 19 which is able to engage into a coupling recess 20 in a respective end part 21 of operating beam 11.

Figure 5:
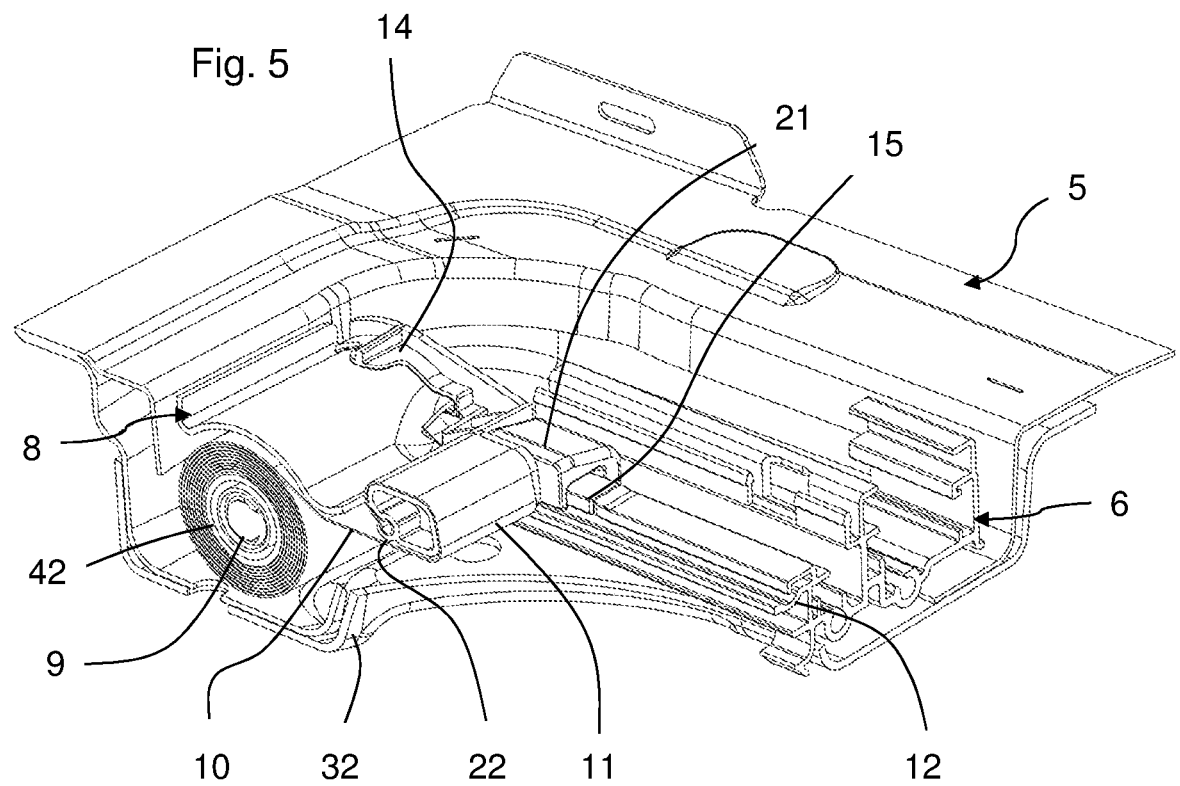
FIG. 5 is an enlarged perspective view of detail V in FIG. 2a, partly cut away.

FIG. 3b clearly shows that an attachment portion 10' at the free end of rollo screen 10 is wrapped around operating beam 11 and is provided with a rod 22 which can be clamped in a groove 23 of operating beam 11 (see e.g., in FIGS. 5 and 7).

FIGS. 4a and 4b are a cross section/plan view showing the parts of the exploded view of FIG. 3 in mounted condition. It is clearly visible that drive cable 18 is slidably guided in a cable guide 24 in guide rail 6. Coupling part 19 on drive cable 18 prevents rotation of drive cable 18 due to its walls engaging fitting walls of guide rail 6. End part 21 of operating beam 11 extends above and beyond upper wall part 16 of guide channel 12 and is provided in a downwardly extending outer end wall 25 with a guide groove 26 in its side facing rollo screen 10. This guide groove 26 extends around a horizontal guide rib 27 which is facing away from rollo screen 10 and is aligned with the adjacent portion of lower wall part 17 of guide channel 12. This engagement of guide rib 27 in guide groove 26 fixes operating beam 11 vertically (Z-direction). The lower side of end part 21 of operating beam 11 is provided with a low friction liner 28 engaging guide rail 6, especially vertical walls 29 and 30 defining guide channel 12, so as to fix operating beam 11 in transverse direction (Y-direction). As a result, operating beam 11 is only able to slide along guide rails 6, driven by drive cable 18 through coupling cam 19 engaging coupling recess 20.

FIG. 4a further show a clamping projection 31 (also shown in FIGS. 3a and 3c) engaging below lower wall part 17 of guide channel 12 in guide rail 6. Together with guide part 15 the rollo housing end part 14 is clamped to guide rail 6.

FIGS. 3a and 4b show that guide rib 27 is not only present on guide rail 6, but also on guide part 15 of rollo housing end part 14. In FIG. 4b one can recognize that guide rib 27 on end part 21 is shorter than guide part 15, while guide rib 27 on guide rail 6 is longer than upper wall part 16. The reason will be explained later-on when a mounting operation of the rollo system is elucidated.

Figure 6:
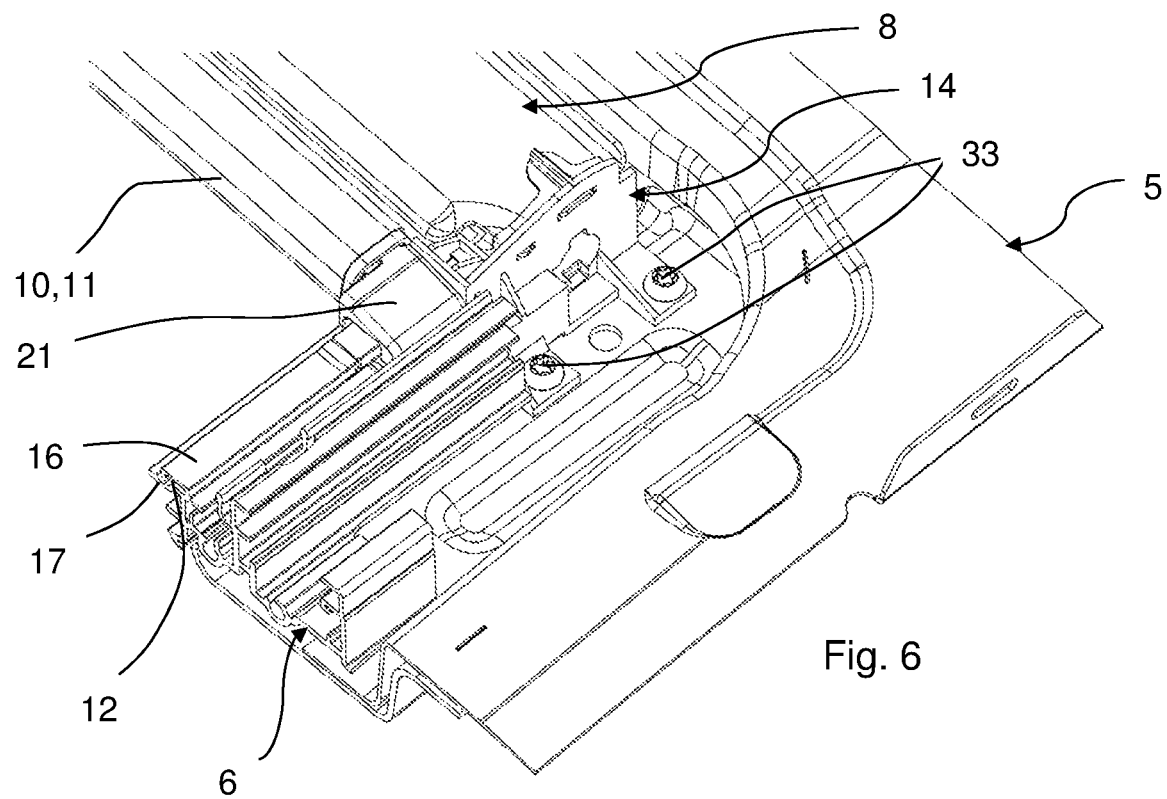
FIG. 6 shows the same detail V, but from a different direction.

FIGS. 5 and 6 show how rollo assembly and guide rail 6 are fitting within a depression in frame 5. The rollo housing 8 and guide rails 6 are covered from below by a cover 32 fixed to frame 5. End parts 14 of rollo housing 8 are fixed to cover 32 by fasteners 33.

In FIGS. 7 and 8 it is shown in detail how rollo housing end part 14 is fixed to guide rail 6 and how rollo screen 10 is guided into guide channel 12. Clamping projection 31 is visible in both figures, and it can also be seen that the end of guide rail 6 abuts against a wall 34 of rollo housing end part 14. FIG. 8 is a longitudinal section through guide channel 12. One can recognize a portion of guide strip 13 and rollo screen 10 separated from each other. A pilot 35 of end part 21 of operating beam 11 engages between rollo screen 10 and guide strip 13 ensuring that guide strip 13 is positioned correctly in guide channel 12. It further shows that rollo screen 10, once guided into guide channel 12 is guided on a continuous lower wall part 17 of guide channel 12. The upper wall part 16 of guide rail 6 and guide part 15 meet each other in a slightly upward seam 41 so that wear of guide strip 13 is minimized when passing the seam 41.

FIG. 8 also shows upper and lower guide walls 43 and 44 which guide the side edge of rollo screen into guide channel 12 of guide rail 6.

Figure 9:
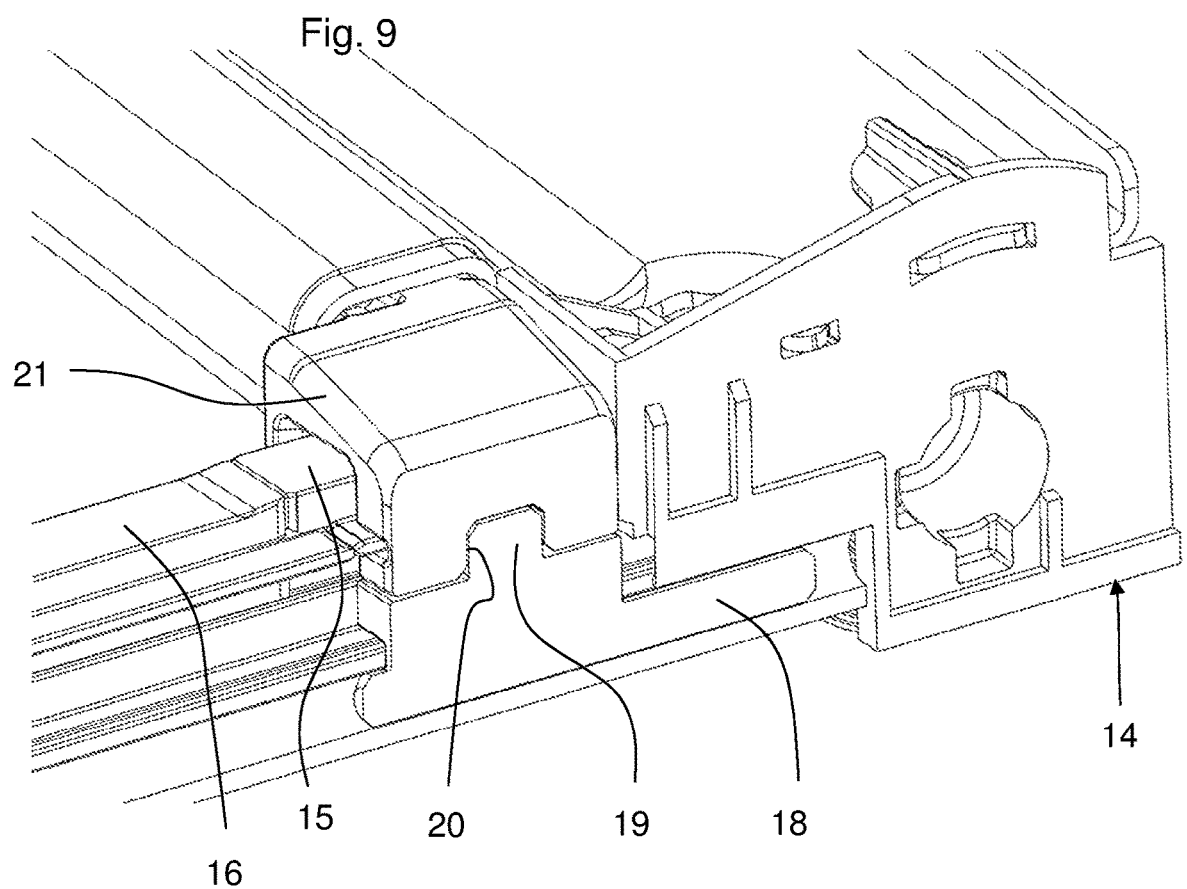
Figure 10:
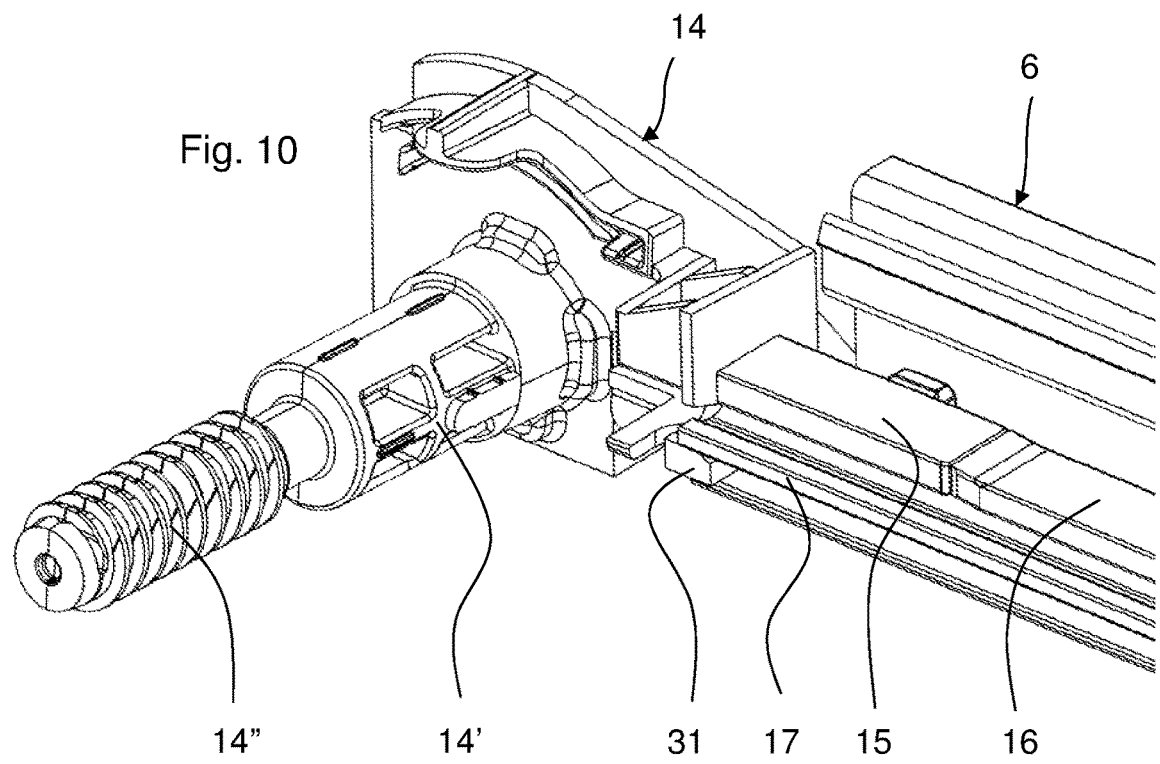
FIG. 10 is an enlarged perspective view similar to that of FIG. 5, but with only the end part of the rollo housing and the guide rail.

The section of FIG. 9 clearly shows how coupling cam 19 of drive cable 18 projects into coupling recess 20 of operating beam end part 21. FIG. 10 illustrates again how rollo housing end part 14 is clamped to guide rail 6 by means of amongst others guide part 15 and clamping projection 31.

Figure 11:
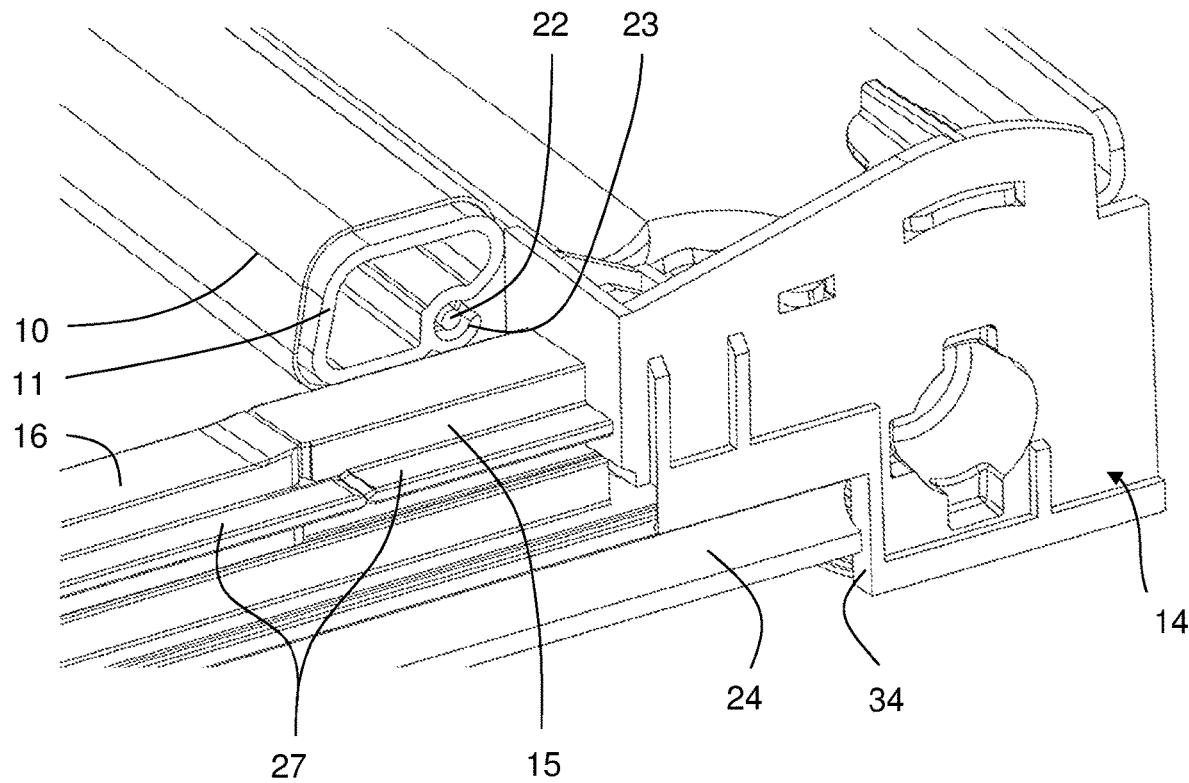
Figure 12:
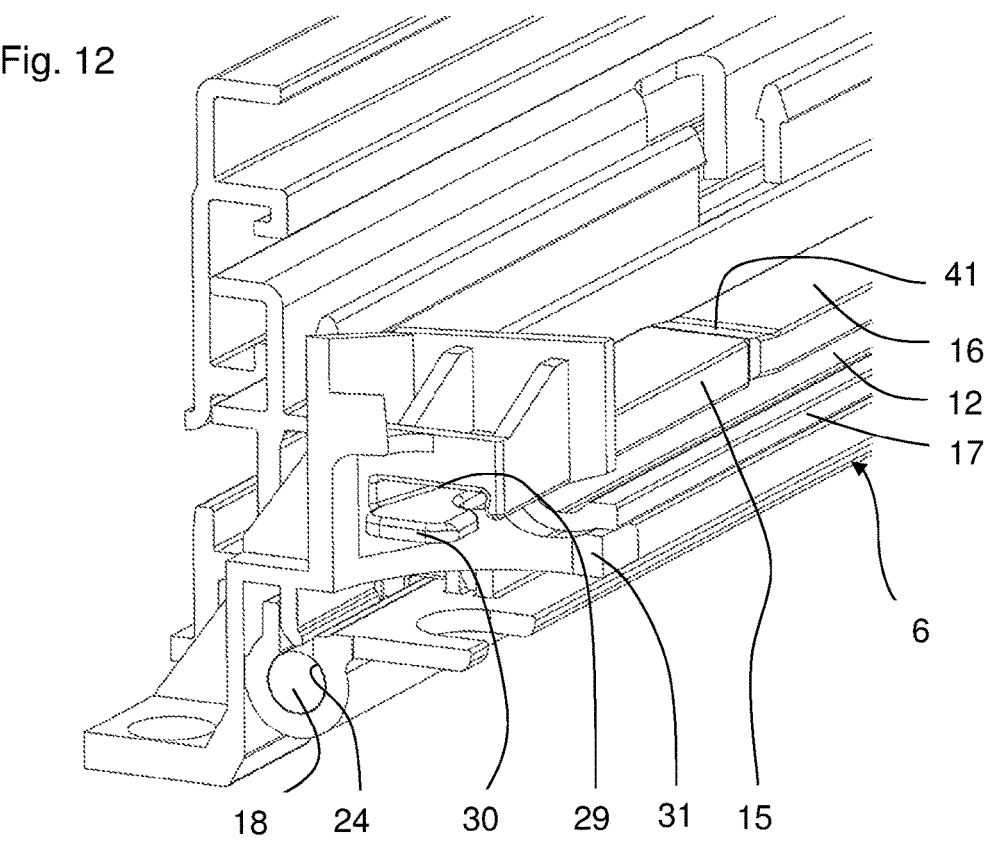
FIG. 12 is a perspective sectional view along the line XII in FIG. 4b.

FIGS. 11 and 12 further illustrate how end part 14 of rollo housing 8 and guide rail 6 are positioned with respect to each other. It is shown that the cable guide 24 ends at a wall 34 of end part 14, so that it becomes clear that drive cable 18 extends in forward direction and a drive motor (not shown) for both left and right drive cables 18 will be attached in the centre of a front beam 36 (FIG. 2a, 2b) of frame 5. In FIG. 12 one can recognize upper and lower walls 29, 30 of end part 14 which guide the side edge of rollo screen 10 into guide channel 12.

FIG. 13 shows several cross-sections through guide rail 6 and operating beam 11 in its starting position with rollo screen 10 fully opened.

FIG. 13a is a cross-section through guide rail 6 just before upper wall part 16 of guide channel 12 ends.

In FIG. 13b, the front portion of guide part 15 is cut, but guide rib 27 is still part of guide rail 6, not yet of guide part 15.

In FIG. 13c, guide rib 27 is now part of guide part 15. This cross-section also shows that a vertical flange 37 of guide part 15 is partly inserted between two vertical flanges 38 and 39 of guide rail. Flange 38 also carries lower wall part 17 of guide channel 12 and guide rib 27 (see FIG. 13a, b). Flange 39 is also engaged by coupling part 19 of drive cable 18.

FIG. 13d shows engagement of coupling cam 19 of drive cable into coupling recess 20 of operating beam end part 21 and engagement of guide rib 27 in guide groove 26 at the position of coupling recess 20.

FIGS. 14 and 15 illustrate how end part 14 of rollo housing 8 is assembled with guide rail 6.

In FIG. 14a, drive cable 18 is in its end position, whereas operating beam 11 is in its starting position adjacent rollo housing 8. End part 14 of rollo housing 8 is positioned above guide rail 6 such that vertical flange 37 of guide part 15 is positioned just beyond guide rib 27 of guide rail 6. In this position, coupling recess 20 is not vertically aligned with coupling cam 19 of drive cable 18. This position is also shown in FIG. 15. It is clearly visible that guide channel 12 is not assembled yet as lower wall part 17 on guide rail 6 is vertically separated from upper wall part formed by guide part 15. Clamping projection 31 is position just beyond lower wall part 17 of guide rail 6 (FIG. 15).

In FIG. 14b, operating beam 11 is moved slightly away from rollo housing 8 such that coupling recess 20 is now vertically aligned with coupling cam 19 of drive cable 18.

In FIG. 14c, end part 14 of rollo housing 8 is moved vertically onto guide rail 6, such that coupling cam 19 of drive cable 18 has become engaged into coupling recess 20 of end part 21 of rollo beam 11. Vertical flange 37 of guide part 15 has been inserted between flanges 38 and 39 of guide rail 6 (not shown here), such that guide rib 27 on guide part 15 has become aligned with guide rib 27 on guide rail 6. However, the guide ribs 27 are spaced from each other.

In FIG. 14d, end part 14 of rollo housing 8 is moved forwardly in longitudinal (X) direction, such that the end of guide rail 6 abuts against wall 34 of rollo housing end part 14. In this position, clamping projection 31 of guide part 15 has been slid below lower wall part 17 of guide channel 12 (cf. FIG. 8) and free end of guide part 15 has abutted with upper wall part 16 of guide channel 12 in guide rail 6 to form seam 41. Furthermore, guide ribs 27 of guide part 15 and guide rail 6 have become abutted, and to enable this guide part 15 is provided with a horizontal groove 40 (FIG. 14b) into which guide rib 27 of guide rail 6 can engage in order to meet guide rib 27 of guide part 15 which is slightly spaced from the front end of guide part 15. This engagement of guide rib 27 of guide rail 6 with groove 40 of guide part 15 causes a vertical fixation at the front end of guide part 15 where clamping projection 31 prevents a vertical movement of end part 14 with respect to guide rail 6 at the rear end of guide part 15. In the position of FIG. 14d the assembly is complete and the rollo assembly is ready for use.

The invention is not limited to the embodiments described before which may be varied widely within the scope of the invention as defined by the appending claims.

What is claimed is:
1. A rollo assembly for use in a roof system for a vehicle, comprising:
a rotatable winding shaft accommodated in a rollo housing;

a rollo screen of which a rear end is wound on or off said winding shaft to enable the rollo screen to move between an open and closed position and having an opposite forward end;

an operating beam joined to the forward end to move the rollo screen between the open and closed position; and opposite guide channels configured to hold opposite side edges of the rollo screen and guiding them in a longitudinal direction, wherein each end portion of the guide channels adjacent to the rollo housing includes a lower wall part formed by a respective guide rail and an upper wall part formed by a guide part which belongs to or is fixed to the rollo housing.

2. The rollo assembly according to claim 1, wherein a length of the guide parts is shorter than a length of the guide channels and wherein a free end of the guide part facing away from the rollo housing abuts an upper part of the guide channel formed by the guide rail.

3. The rollo assembly according to claim 1, wherein opposite end parts of the operating beam are extending above an upper side of the guide parts in the open position of the rollo screen.

4. The rollo assembly according to claim 3, wherein the opposite end parts of the operating beam are provided with a low friction liner or slide shoes, which cooperate with an external portion of the guide rails and of the guide parts.

5. The rollo assembly according to claim 4, wherein the guide rails and the guide parts are provided with aligned and abutting guide ribs.

6. The rollo assembly according to claim 5, wherein the guide ribs are substantially horizontal and are positioned on a wall of the guide rails and guide parts facing away from the rollo screen.

7. The rollo assembly according to claim 6, wherein the opposite end parts of the operating beam are provided with a guide groove in a wall of the end parts of the operating beams facing the rollo screen, said guide ribs engaging the corresponding guide grooves.

8. The rollo assembly according to claim 6, wherein the guide ribs are positioned substantially at a level of the lower wall part of the guide channel.

9. The rollo assembly according to claim 5, wherein a length of the guide rib on the guide parts is smaller than a length of the guide parts.

10. The rollo assembly according to claim 9, wherein the guide rib of the guide rails is longer than the upper wall part of the guide channel in the guide rails and wherein a protruding portion of the guide rib is clamped within a groove of the guide part.

11. The rollo assembly according to claim 1, wherein the operating beam is driven by drive cables coupled to the opposite end parts of the operating beam and guided by cable guides in the guide rails, and wherein the opposite end parts of the operating beam engage a coupling part on the drive cables from above.

12. The rollo assembly according to claim 1, wherein the guide parts or rollo housing comprises a clamping projection engaging the guide rail from below.

13. The rollo assembly according to claim 1, wherein the guide parts include a downwardly extending flange engaging between upwardly extending flanges of the guide rails.

14. The rollo assembly according to claim 1, wherein the guide parts are formed integral with end parts of the rollo housing.

15. The rollo assembly according to claim 11, wherein the guide parts are formed integral with end parts of the rollo housing, each being provided with a support for the winding shaft.

* * * * *